United States Patent
Nomura et al.

(10) Patent No.: US 7,251,580 B2
(45) Date of Patent: Jul. 31, 2007

(54) METHOD FOR MEASURING CURVED SURFACE OF WORKPIECE, PROGRAM AND MEDIUM THEREOF

(75) Inventors: Yoichi Nomura, Kawasaki (JP); Hirokazu Michiwaki, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 167 days.

(21) Appl. No.: 10/965,335

(22) Filed: Oct. 14, 2004

(65) Prior Publication Data

US 2005/0086025 A1    Apr. 21, 2005

(30) Foreign Application Priority Data

Oct. 20, 2003  (JP) .............................. 2003-358636
Oct. 20, 2003  (JP) .............................. 2003-358637

(51) Int. Cl.
*G01B 3/22* (2006.01)
(52) U.S. Cl. ...................................... 702/168; 702/167
(58) Field of Classification Search ............... 702/167, 702/168
See application file for complete search history.

(56) References Cited

U.S. PATENT DOCUMENTS

| | | | |
|---|---|---|---|
| 4,166,323 A | | 9/1979 | Maag |
| 4,532,715 A | | 8/1985 | Sterki |
| 4,901,253 A | | 2/1990 | Iwano et al. |
| 5,392,644 A | * | 2/1995 | Frazier ........................ 73/162 |
| 6,154,713 A | * | 11/2000 | Peter et al. ................... 702/95 |

FOREIGN PATENT DOCUMENTS

| | | |
|---|---|---|
| DE | 198 21 371 A1 | 11/1999 |
| DE | 101 31 160 A1 | 1/2003 |
| WO | WO 02/23292 A2 | 3/2002 |

\* cited by examiner

*Primary Examiner*—John Barlow
*Assistant Examiner*—Stephen S. Cherry
(74) *Attorney, Agent, or Firm*—Rankin, Hill, Porter & Clark LLP

(57) ABSTRACT

A theoretical expression of a workpiece (W) the curved surface of which is measured by a measuring probe (110) equipped with a stylus (111) is specified, a measuring area where the measurement is executed on the measuring surface of the workpiece (W) is determined, and the axis angles of the stylus (111) are determined based on the coordinate values and the normal vector of a representative point determined in the measuring area.

17 Claims, 18 Drawing Sheets

FIG.21

| NAME | HYPOID RING GEAR PARAMETERS |
|---|---|
| NUMBER OF TEETH | 45 |
| DIAMETER | 138.81 |
| FACEWIDTH | 24 |
| TIP CONE DISTANCE | 83.82 |
| MEAN CONE DISTANCE | 71.84 |
| ADDENDUM | 0.93 |
| DEDENDUM | 6.04 |
| PITCH ANGLE | 79° 48' |
| RAKE ANGLE | 80° 38' |
| MEAN RAKE ANGLE | 33° 08' |
| MOUNTING DISTANCE | 40.00 |
| MODULE | 3.667 |

FIG.22

| NAME | MACHINE SETTING PARAMETERS (THEORETICAL VALUE) |
|---|---|
| RADIAL SLIDING VALUE Rsg | 70.598 |
| CUTTER CENTER ROTATING ANGLE Asg | 154° 55' |
| COORDINATE OF CUTTER CENTER Zg | 0.0 |
| CUTTER RADIUS Rg | 76.2 |
| POINT WIDTH Wg | 2.54 |
| MACHINE ROOT ANGLE $\lambda gr$ | 75° 02' |
| OUTER CUTTING BLADE ANGLE $\gamma'1g$ | 17° 00' |
| INNER CUTTING BLADE ANGLE $\gamma 2g$ | 17° 00' |
| DISTANCE FROM V AXIS TO GEAR REFERENCE PLANE Lg | 40.02 |

METHOD FOR MEASURING CURVED SURFACE OF WORKPIECE, PROGRAM AND MEDIUM THEREOF

BACKGROUND OF THE INVENTION

1. Field of the Invention

The present invention relates to a method for measuring a curved surface of a workpiece, particularly to a method for measuring a curved surface of a workpiece so as to avoid the interference between the workpiece and a measuring probe.

2. Description of Related Art

Workpieces that have curved surfaces are of great variety and generally the machining of such curved surface of a workpiece is difficult to do. Therefore, the measurement of a curved surface of a workpiece with a high degree of accuracy is strongly demanded.

A gear is cited as a representative example of a workpiece having such a curved surface and, particularly in the final speed reducer of an automobile or the like, gears such as spiral bevel gears and hypoid gears having tooth flanks of curved surfaces are frequently used as gears to change the direction of a rotation axis and reduce the speed in the transmission of rotation power.

A spiral bevel gear is configured so that a ring gear and a pinion engage with each other and their axes intersect with each other on the same plane as shown in FIG. 20.

In contrast, in the case of a hypoid gear, although a ring gear and a pinion engage with each other likewise, their axes do not intersect with each other on the same plane and so-called offset is incorporated. In this regard, the features of a hypoid gear are that it has a high degree-of-freedom of spatial allocation in a power transmission system and moreover allows smoother rotation, quieter operation and also higher tooth strength than a spiral bevel gear.

Such gears are required to prevent wear and noise making from the standpoint of power transmission, thus high accuracy machining is inevitably required, and resultantly a measurement method with a high degree of accuracy is longed for.

However, the tooth flank of such a gear curves in both the tooth trace and tooth depth directions and therefore a problem here is that both the machining and measurement of the gear are difficult to do.

For example, in the case of the ring gear of a hypoid gear having the basic parameters shown in FIG. 21, gear generation is executed with a gear generator based on the theoretical machine setting parameters shown in FIG. 22. The same is true in the case of a pinion and, if nothing is done, a gear pair showing good tooth bearing can not always be obtained due to the mechanical errors and the like of a gear generator.

In this light, a gear pair showing good tooth bearing, which is the final target, is secured by repeated trial gear cuttings (iterative gear cutting operation for better tooth bearings through correcting machine setting parameters) depending on the experience and intuition of a field technician while observing the tooth bearing which is a contact imprint between tooth flanks. This procedure is called "development" (iterative operation for having good tooth bearing).

If the development track (which machine setting parameters is corrected by what degree) can be clarified reversely from a gear produced through the aforementioned procedure, then the influence of mechanical errors intrinsic to each gear generator can be avoided. With the aim of that, methods for estimating machine setting parameters have been under study.

An example of gear cutting principles of the ring gear of a hypoid gear is explained referring to FIG. 23.

A cutter 1 of a gear generator is supported by a cradle 2 so as to be rotatable around the cutter axis zc.

Meanwhile, the base material of a ring gear blank as a workpiece W is supported by a workpiece head 3 so as to be rotatable but the workpiece W does not rotate and is fixed while a tooth of the ring gear is in cutting operation.

The coordinate system shown in FIG. 23 includes: a machine coordinate system consisting of an origin point Om being the center of a machine, cradle axis (zm axis), H axis (ym axis) and V axis (xm axis: an axis passing through the origin point Om and being perpendicular to the cradle axis (zm axis) and the H axis); and a cutter coordinate system consisting of an origin point Oc being the center of a cutter and xc, yc and zc axes (refer to FIG. 25).

In addition, with regard to a workpiece W, there is a gear coordinate system consisting of an origin point Og being the center of a gear and xg, yg and zg axes (refer to FIG. 25).

Here, the workpiece axis zg and the cradle axis zm are on the same plane and the machine center Om coincides with the gear center Og.

With regard to the mutual relationship among the coordinate systems on the VH plane, as shown in FIG. 24, the offset between the V axis (xm axis) and the xc axis is represented by Hg and the offset between the H axis (ym axis) and the yc axis is represented by Vg. Here, Xgc shows the position vector on the locus of a cutting blade edge formed when the cutting blade edge of a cutter 1 rotates around the cutter center Oc.

The mutual relationship among the coordinate systems on the ym-zm plane is as shown in FIG. 25. Here, the distance from the reference plane Wb of a workpiece to the gear center Og (V axis) is represented by Lg and a machine root angle (an angle formed by the ym axis and the zg axis) is represented by kgr.

Under such a configuration, after finishing cutting one tooth of a workpiece W with a cutter 1, the rotation of the cutter 1 stops and the workpiece W is retreated, thereafter the workpiece W is rotated by a predetermined angle around the zg axis and the cutting of the next tooth starts while the cutter 1 is rotated again and the workpiece W is returned to the cutting position. All teeth are cut by repeating above procedure, which effectuates that the position vector Xgc representing the rotation locus of the cutter 1 is transcribed on the workpiece W.

The machine setting parameters of the workpiece W (ring gear) cut in such a way as stated above are estimated in the following manner:

1) With regard to the aforementioned gear tooth flank in which one tooth flank is formed by one curved line, a theoretical tooth flank expression $X(u, v, C1, C2, \ldots, Cn)$ is created by mechanistically describing the gear cutting process based on each of the theoretical gear cutting parameters (theoretical machine setting parameters: C1, C2, Cn). (Here, X represents a vector, u does the rotating angle of the cutter 1, and v does the distance from the cutter center Oc to the cutting blade edge.)

2) Measured tooth flank data M is obtained by measuring the tooth flank in terms of three-dimensional coordinates (M is a vector).

Here, Mi, the i-th measured data, is expressed by the expression:

$$Mi = X(ui, vi, C1+\Delta C1, C2+\Delta C2, \ldots, Cn+\Delta Cn) \quad (1),$$

and the difference between the measured tooth flank data M and a value given by the theoretical tooth flank expression X is determined as residual (M−X). (Here, $\Delta C1, \Delta C2, \ldots,$ and $\Delta Cn$ mean the unknown correction amounts of the theoretical machine setting parameters.)

$$M-X(u, v, C1, C2, \ldots, Cn) = (\Delta C1 \cdot \partial X/\partial C1) + (\Delta C2 \cdot \partial X/\partial C2) + \ldots + (\Delta Cn \cdot \partial X/\partial Cn) \quad (2).$$

3) Such gear cutting parameter $Cj+\Delta Cj$ as the sum of the square of the residual becomes minimum and the standard deviation at that time are computed by the least-square method for the cases of $j=1$ to n.

4) The gear cutting parameter Ck which makes the standard deviation to be minimum is searched and $Ck+\Delta Ck$ is regarded as the estimated value of the gear cutting parameter.

5) The estimated values of the gear cutting parameters other than the k-th are computed likewise by using the estimated value of the gear cutting parameter $Ck+\Delta Ck$, and the estimated values of all the gear cutting parameters are computed by further repeating this procedure.

6) In measuring the tooth flank in the three-dimensional coordinate, when the coordinate system of the theoretical tooth flank expression Xg before transforming the coordinate data is defined as Og-xg, yg, zg, and the coordinate system of the coordinate measuring machine is defined as Ot-xt, yt, zt, the coordinate system of the coordinate measuring machine is defined as Ot-xt, yt, zt, one of the coordinate axes of the coordinate measuring machine (for example Z coordinate axis zt) is conformed to the gear axis zg and the pitch cone apex (the origin point Og in the coordinate system of the theoretical tooth flank expression X) is conformed to the origin point Ot in the coordinate system of the coordinate measuring machine. (The locus of the cutting blade edge is transcribed to the workpiece W and therefore it is possible to obtain the theoretical tooth flank expression Xg by transforming the coordinate data of the theoretical expression X that expresses the locus of the cutting blade tip). (Xg is a vector).

7) When an unknown angle formed between another coordinate axis of the coordinate measuring machine (for example X coordinate axis xt) and another coordinate axis of the theoretical tooth flank expression Xg (for example X coordinate axis xg) is defined as $\Psi$, the result obtained by rotating the theoretical tooth flank expression Xg before transforming around the zt axis by the coordinate transformation matrix $C(\Psi)$ related to the rotation is expressed as follows (C and X are vectors):

$$Xt = C(\Psi)Xg \quad (3).$$

Based on this relationship, an angle $\Psi$ can be obtained in addition to the estimated machine setting parameters ($C1+\Delta C1, C2+\Delta C2, \ldots, Cn+\Delta Cn$) by the aforementioned method and therefore it becomes possible to transform the theoretical tooth flank expression into a measurement coordinate system. Note that, since $\Psi$ is subordinate to all the gear cutting parameters ($C1, C2, \ldots, Cn$), if the unknowns of $C1, C2, \ldots Cn$ and $\Psi$, namely n+1 in total, are not solved by simultaneous equations, they are solved by applying dual simultaneous equations related to the least-square method to each combination of ($\Psi$ and C1), ($\Psi$ and C2), . . . , ($\Psi$ and Cn), namely n combinations in total.

However, in such a method for estimating machine setting parameters, though it is necessary to obtain measured tooth flank data M by measuring the data at many points on the tooth flank by way of coordinate measuring, a part program cannot be generated due to the fact that the workpiece tooth flank expression in the workpiece coordinate system is unknown, therefore manual measurement has to be applied.

This causes blockage of efficiency improvement in estimating machine setting parameters. Moreover, long time manual measurement is required and therefore the problem here is that the environmental conditions of measurement change due to human body temperature, resulting the dimensions of a workpiece W also change, and measurement with a high degree of accuracy cannot be secured. In addition, even in the case of manual measurement, the coordinate values (theoretical values or true values) of a measurement point are unknown and therefore the workpiece is hardly evaluated.

Further, in the case of measuring the curved surface of a workpiece such as the tooth flank of a spiral bevel gear by using a touch signal probe or a scanning probe, since the measuring plane curves, a problem here is that the stylus of the probe or a spherical contact tip at the tip of the probe may interfere with the gear.

SUMMARY OF THE INVENTION

An main object of the present invention is to provide: a method for measuring a curved surface of a workpiece that allows to measure with safety and a high degree of accuracy the measurement points of the workpiece having a curved surface such as a tooth flank of a spiral bevel gear; a program thereof; and a medium thereof.

In order to attain the above object, a method for measuring a curved surface of a workpiece includes: a theoretical expression input step for obtaining a theoretical expression of the workpiece, the curved surface of which is measured with a measuring probe having a stylus; a measuring area determination step for determining a measuring area on the curved surface which is a range of measuring; a representative point computation step for defining a representative point in the measuring area and computing coordinate values and a normal vector of the representative point based on the theoretical expression; and an axis angle determination step for determining an axis angle of the stylus based on the normal vector.

Here, the theoretical expression may also be an expression of measured shape obtained as a result of the analysis of measured data.

Alternatively, the theoretical expression may be computed based on basic parameters of workpiece design and the like instead of the theoretical expression input.

Further, as the axis angle of the stylus, it is acceptable to compute the tangent vector of the curved surface of the workpiece in the measuring area based on the normal vector and then compute a flank direction axis angle based on the tangent vector. The tangent vector is a vector that perpendicularly intersects with the normal vector and plural tangent vectors can be defined. Here, the plane containing the plural tangent vectors is representatively called a tangent vector.

Here, the flank direction axis angle means an angle for parallelizing with each other the plane that is tangent to the curved surface of the workpiece in the measuring area and contains the tangent vector, and the plane that contains the axis of the stylus.

Further, as the axis angle of the stylus, the slant axis angle of the stylus may be computed based on the workpiece shape in the measuring area.

Furthermore, it is acceptable to divide the measuring area beforehand into a predetermined number of portions, and it is also acceptable to judge the degree of the curve of the measuring area from the internal angles of plural normal vectors in the measuring area and then divide the measuring area according to need.

Here, the internal angle means: the least angle formed at the intersection when a first normal line or its extension and a second normal line or its extension intersect with each other; or, when a first normal line or its extension and a second normal line or its extension do not intersect with each other, the least angle formed by projecting the second normal line on the plane containing the first normal line and crossing the projected normal line or its extension and the first normal line or its extension.

Furthermore, it is acceptable to input the measurement conditions including information on a measuring instrument and generate a measurement part program based on the measurement conditions and the information on the theoretical expression and the axis angle.

Yet further, in the event of actual measurement, it is acceptable to determine a workpiece coordinate system based on the mounting attitude of the workpiece and conform the theoretical coordinate system of the theoretical expression to the workpiece coordinate system.

Additionally, when the workpiece coordinate system and the theoretical coordinate system of the theoretical expression are different from each other, it is acceptable to transform the coordinate values and the axis angle computed in the theoretical coordinate system into the coordinate values and the axis angle in the workpiece coordinate system.

In addition, it is preferable: that the theoretical expression input step includes a parameter input step for inputting basic parameters based on the two-dimensional design drawing of the workpiece, and the theoretical expression computation step of computing the three-dimensional theoretical expression of the workpiece based on the basic parameters; and that, in the representative point computation step, the representative point is determined in a two-dimensional coordinate based on the two-dimensional design drawing and the three-dimensional coordinate values and the normal vector of the representative point are computed based on the three-dimensional theoretical expression.

Here, as the coordinate system of the two-dimensional design drawing, not only a Cartesian coordinate system but also a polar coordinate system, in essence any coordinate system as long as it can be described on a two-dimensional plane, can be adopted and, as the theoretical coordinate system of the three-dimensional theoretical expression, not only a Cartesian coordinate system but also any coordinate system as long as it is a coordinate system capable of defining a three-dimensional space, such as a polar coordinate system, can be adopted. That is, they are accepted as long as the coordinate transformation is possible between a design coordinate system and a theoretical coordinate system.

Further, it is preferable to add a design coordinate transformation parameter computation step of computing a coordinate transformation parameter between the design coordinate system of the two-dimensional design drawing and a theoretical coordinate system of the three-dimensional theoretical expression.

According to the present invention, since the axis angle of the stylus of the probe in the event of measuring the curved surface of the workpiece is determined based on the theoretical expression of a workpiece, the measurement can be carried out safely and easily without interference between the probe and the workpiece.

Further, since the representative point is determined in the measuring area and the axis angle of the stylus is computed based on the coordinate values and the normal vector at the representative point, the computing load can be mitigated.

Furthermore, since plural representative points are determined at the periphery of the measuring area and the plural normal vectors are compounded, the reliability in the computation of the axis angle in the measuring area can be improved. That is, as long as the axis angle is obtained through the above procedure, the interference between the workpiece and the measuring probe can surely be avoided.

Yet further, since the possibility of the interference between the workpiece and the measuring probe is judged based on the internal angle of the plural normal lines in the measuring area and the measuring area is divided according to the judgment, the interference between the workpiece and the measuring probe can further surely be avoided.

In addition, since the axis angle is determined based on the shape of the workpiece, the interference between the workpiece and the measuring probe can yet further surely be avoided.

Additionally, since a measurement part program including a stylus axis angle control command is generated based on the theoretical expression of the workpiece, it is possible to prepare the measurement part program beforehand even before the completion of the machining of the workpiece itself and to start the measurement operation immediately after the completion of the machining of the workpiece, and resultantly the overall production efficiency improves.

Further, since a measurement part program that can avoid the interference between a measuring probe and a workpiece can be generated even though the workpiece has a complicated curved surface, the improvement of safety and automation in the measurement operation can be facilitated.

Furthermore, since it is possible to compute the three-dimensional coordinate values and the normal vector at a representative point or a designated point determined in the two-dimensional design drawing based on the three-dimensional theoretical expression of the workpiece having the curved surface in the measuring area, the three-dimensional coordinate values on an objective measuring plane can be obtained even before the completion of the workpiece machining.

In particular, since, by using the coordinate transformation parameter, it is possible to easily compute the three-dimensional coordinate values and the normal vector at a representative point or a designated point in the measuring area specified in the two-dimensional coordinate based on the two-dimensional design drawing, a measurement part program and the like are easily generated.

BRIEF DESCRIPTION OF THE DRAWINGS

FIG. 21 is a view explaining an example of basic parameters of the ring gear of a hypoid gear;

FIG. 22 is a view explaining an example of machine setting parameters of the ring gear of the hypoid gear;

DETAILED DESCRIPTION OF PREFERRED EMBODIMENT(S)

Preferred embodiments according to the present invention are hereunder explained based on the drawings.

Embodiment 1

Figure 1:
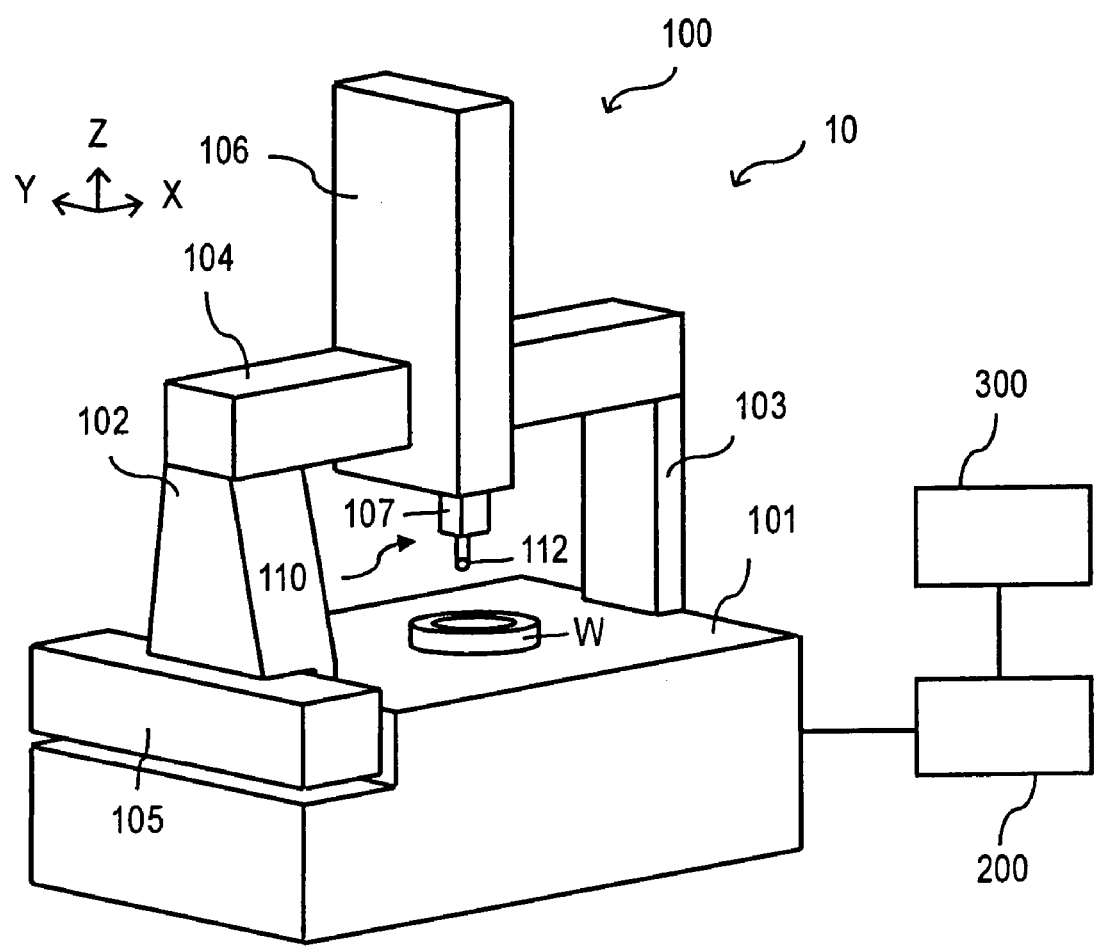
FIG. 1 is a view showing a measurement system according to a first embodiment of the present invention.

FIG. 1 shows a first embodiment of a method for measuring a curved surface of a workpiece by using a coordinate measuring machine according to the present invention and a measurement system 10 is composed of the coordinate measuring machine 100, a controller 200 a the computer 300.

The coordinate measuring machine 100 is equipped with an X axis beam 104 spanned across a column 102 and a supporter 103, those being placed at both ends of a measurement table 101. Further, it is equipped with an X axis slider 106 (X axis transfer mechanism) that is supported by the X axis beam 104 via air bearings and movable in the X axis direction and a Z axis spindle 107 (Z axis transfer mechanism) that is supported by the X axis slider 106 via air bearings and movable in the Z axis direction. The column 102 and the supporter 103 are also supported afloat by the measurement table 101 via air bearings. The column 102 is guided in the Y axis direction by a Y axis guide mechanism 105, which is installed at one end of the measurement table 101, via air bearings and therefore the column 102 and the supporter 103 are movable in an integrated manner in the Y axis direction (Y axis transfer mechanism).

The displacement of each of the X axis slider 106, the column 102 and the supporter 103, and the Z axis spindle 107 is detectable by a respective linear scale. Here, the X, Y and Z axes are in the relation of intersecting with each other at right angles.

A touch signal probe 110 is attached to a bottom end of the Z axis spindle 107 and a spherical contact tip 112 is attached to a tip of a stylus 111 thereof.

A workpiece W (ring gear of a hypoid gear) is mounted on the measurement table 101 and a touch signal is output by bringing the spherical contact tip 112 of the touch signal probe into contact with a tooth flank Wt thereof and the displacement of each of the X, Y and Z axis transfer mechanisms at that moment is read by the respective linear scale and output as the measured data.

Figure 2:
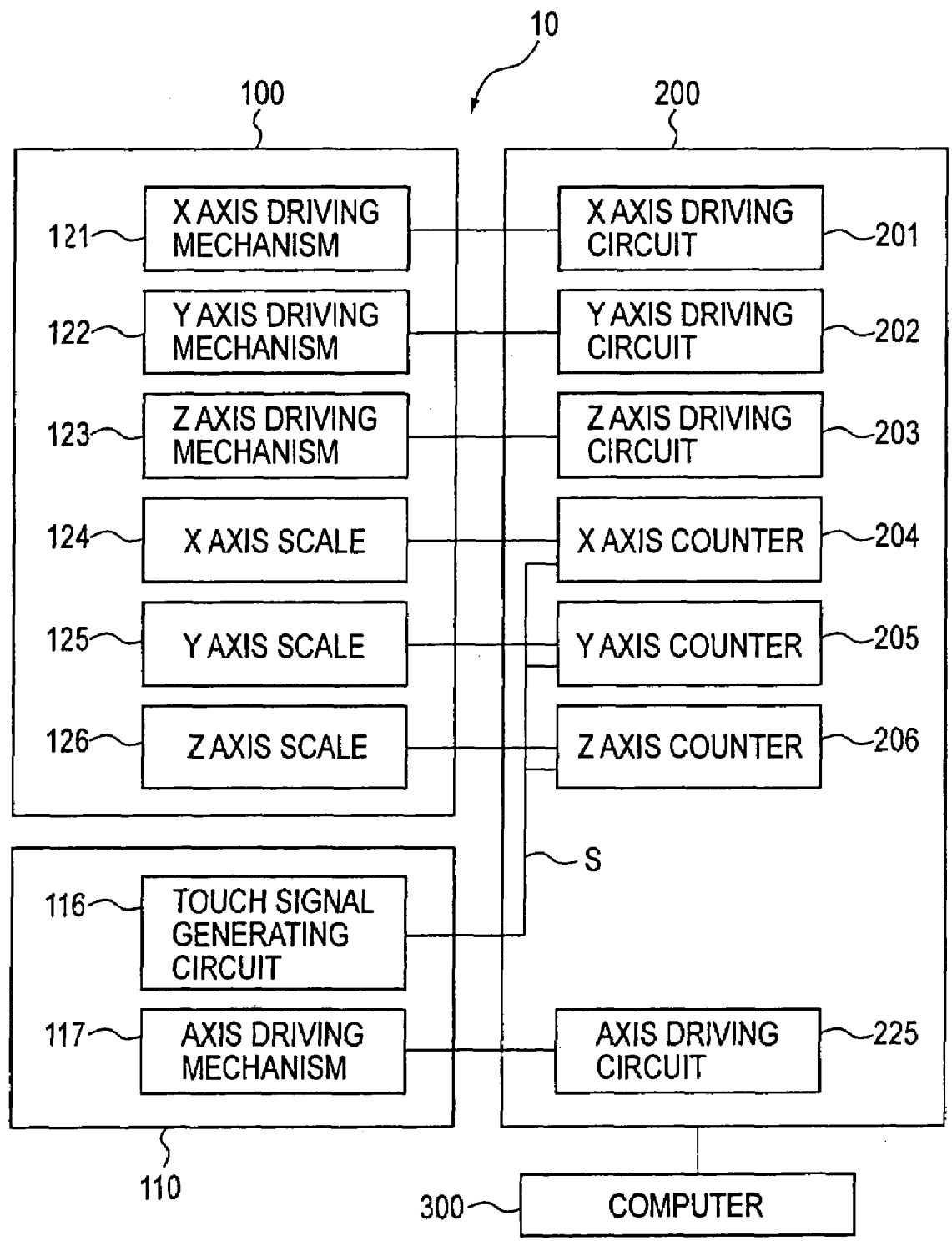
FIG. 2 is a block diagram of the measurement system according to the first embodiment of the present invention.

FIG. 2 shows a block diagram of a major electrical control unit in the measurement system 10.

The coordinate measuring machine 100 is equipped with an X axis driving mechanism 121, a Y axis driving mechanism 122 and a Z axis driving mechanism 123, those being driven by motors, and the X axis slider 106, the column 102 and the supporter 103, and the Z axis spindle 107 are driven by the respective driving mechanisms. The displacement of those sliders is detected by an X axis scale 124, a Y axis scale 125 and a Z axis scale 126, respectively.

The controller 200 is equipped with an X axis driving circuit 201 that drives the motor of the X axis driving mechanism 121, a Y axis driving circuit 202 that drives the motor of the Y axis driving mechanism 122, and a Z axis driving circuit 203 that drives the motor of the Z axis driving mechanism 123. The scales of the axes of the coordinate measuring machine 100 are connected to an X axis counter 204, a Y axis counter 205 and a Z axis counter 206, respectively. The displacement of each axis slider is counted by each of those axis counters and also counter values D (xi, yi and zi) of the axes are output as the measured data by a touch signal S generated in a touch signal generating circuit 116 of the touch signal probe 110.

Figure 3:
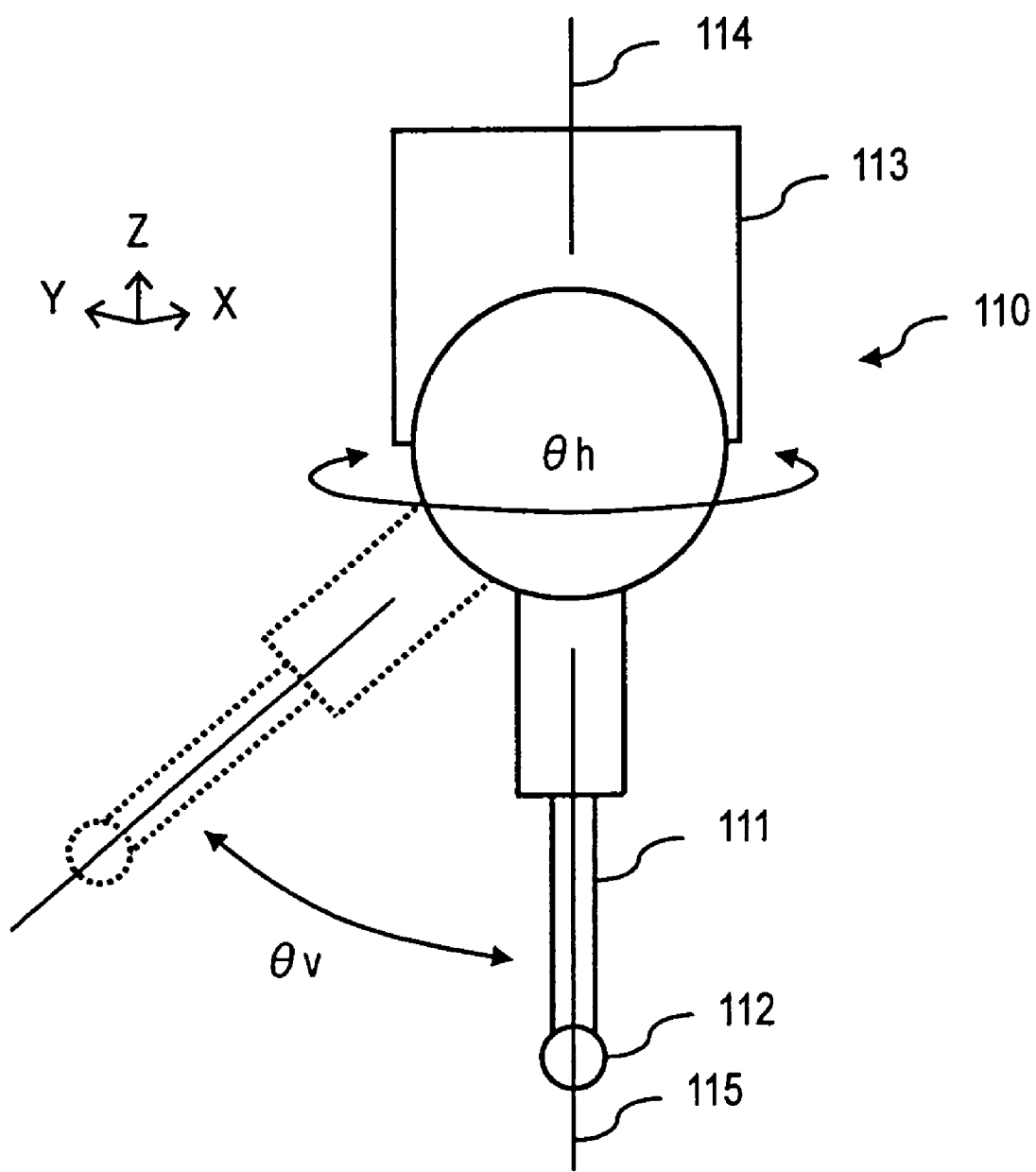
FIG. 3 is a view showing the movement of a touch signal probe.

The touch signal probe 110 is equipped with an axis driving mechanism 117 as well as the touch signal generating circuit 116 and, as shown in FIG. 3, it is designed so that the axis 115 of the stylus 111 is tiltable in an arbitrary direction relative to the axis 114 of the probe body 113 of the touch signal probe 110. To be more precise, the axis driving mechanism 117 is composed of: a vertically tiltable driving mechanism that drives the axis 115 of the stylus 111 so as to tilt by an arbitrary angle θv to the axis 114 of the probe body 113; and a horizontally rotatable driving mechanism that drives the axis 115 of the stylus 111 so as to rotate by an arbitrary angle θh in a plane perpendicular to the axis 114 of the probe body 113.

The axis driving mechanism 117 is driven by the axis driving circuit 225 of the controller 200.

The computer 300 controls the three axis driving circuits 201 to 203 and the axis driving circuit 225 and also inputs the counter values D (xi, yi and zi) of the axes as measured tooth flank data Mi.

The computer 300 is further equipped with various I/O devices (a keyboard, a mouse, a display, a printer, a circuit I/O device, an auxiliary memory, etc.), not shown in the figures, and makes it possible to do various I/O operations, the display and print of computed results and the like according to any purpose.

Figure 4:
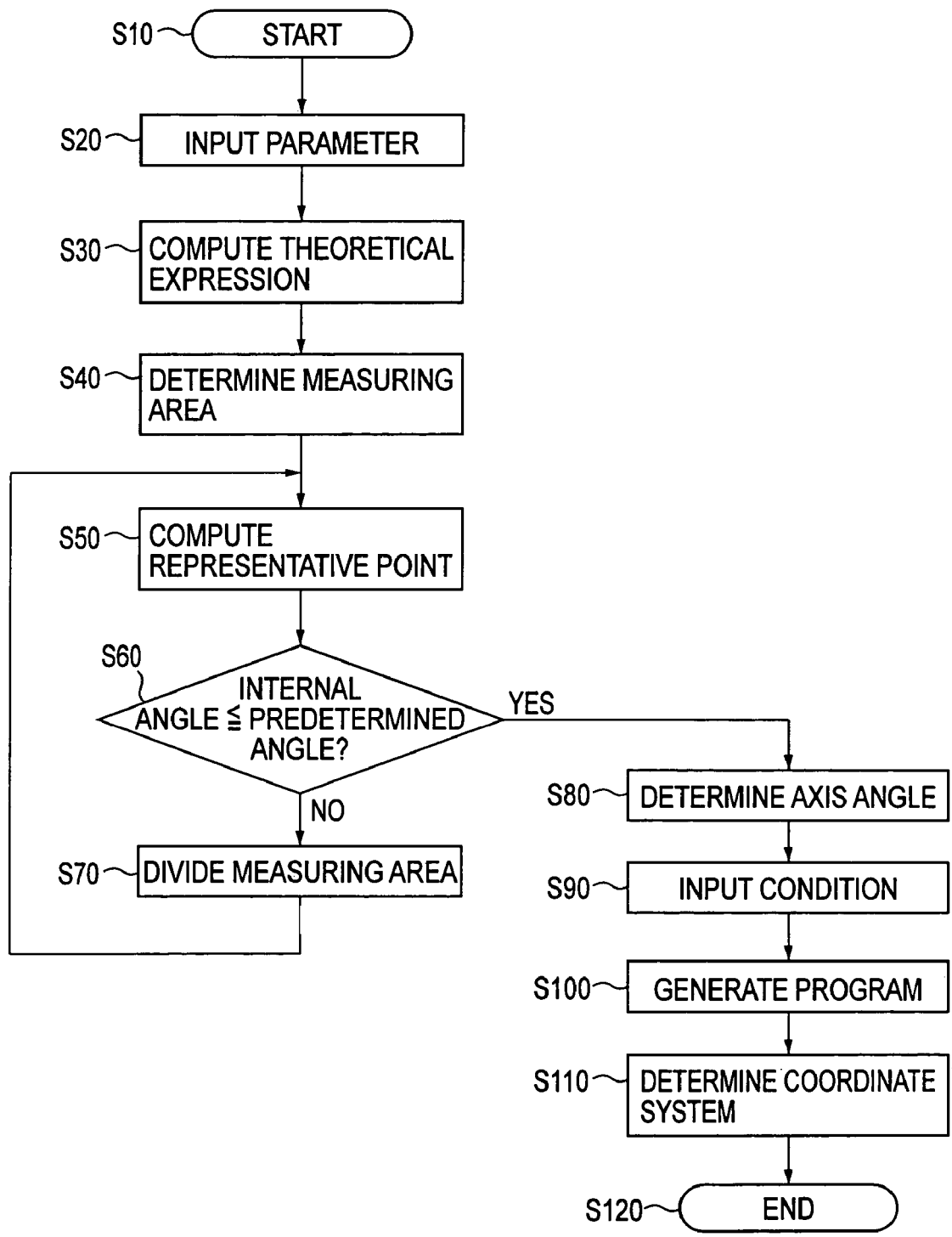
FIG. 4 is a flowchart showing the measurement procedure according to the first embodiment of the present invention.

FIG. 4 is a flowchart showing the procedure of the process in the case where a method for measuring a curved surface of a workpiece according to the present invention is carried out by the computer 300 and the procedure is hereunder explained by taking the case of measuring the tooth flank of a ring gear of a hypoid gear as the workpiece for instance.

Firstly, at step S10, the execution of the method for measuring a curved surface of a workpiece is started.

Next, at step S20, basic parameters (for example, FIG. 21) and machine setting parameters (for example, FIG. 22) are input based on the design drawings and the like of a workpiece W (gear). Here, the machine setting parameters may be replaced with theoretical values or values estimated from the results obtained by measuring an actual gear.

Next, at step S30, a theoretical expression of the tooth flank of the gear is computed based on the basic parameters and the machine setting parameters. The theoretical expression can be obtained by mechanistically describing the gear cutting process based on the theoretical machine setting parameters or the estimated machine setting parameters and, in the case of the ring gear of a hypoid gear for example, a tooth flank expression Xg and a unit tooth flank normal line Ng are calculated by the following expressions:

$$Xg(u, v) = A-1(\lambda gr + \pi/2)\{Xgc(u, v) + Dg\} \quad (4),$$

$$Ng(u, v) = A-1(\lambda gr + \pi/2)Ngc(u) \quad (5).$$

Here, Xg, A (a coordinate transformation matrix related to rotation around an xm axis), Xgc (the position vector on a cutting blade edge), Dg (the position of the cutter center Oc in the coordinate system Om of a gear generator), and Ngc (a unit normal line on the cutting blade edge) are all vectors. Further, u shows the rotating angle of a cutter 1 and v shows the distance from the cutter center Oc to the cutting blade edge. λgr shows a machine root angle (root cone angle) (refer to FIG. 25).

Here, the steps S20 and S30 compose the theoretical expression input steps. However, when the theoretical expression is already known or when the shape expression is already derived from the analysis result of measured data, it is also acceptable to input directly the theoretical expression or the shape expression instead of the computation of the theoretical expression based on parameters such as designed values and the like and to use it as the theoretical expression at the succeeding steps.

Next, at step S40, a measuring area is determined based on the theoretical expression.

Figure 6:
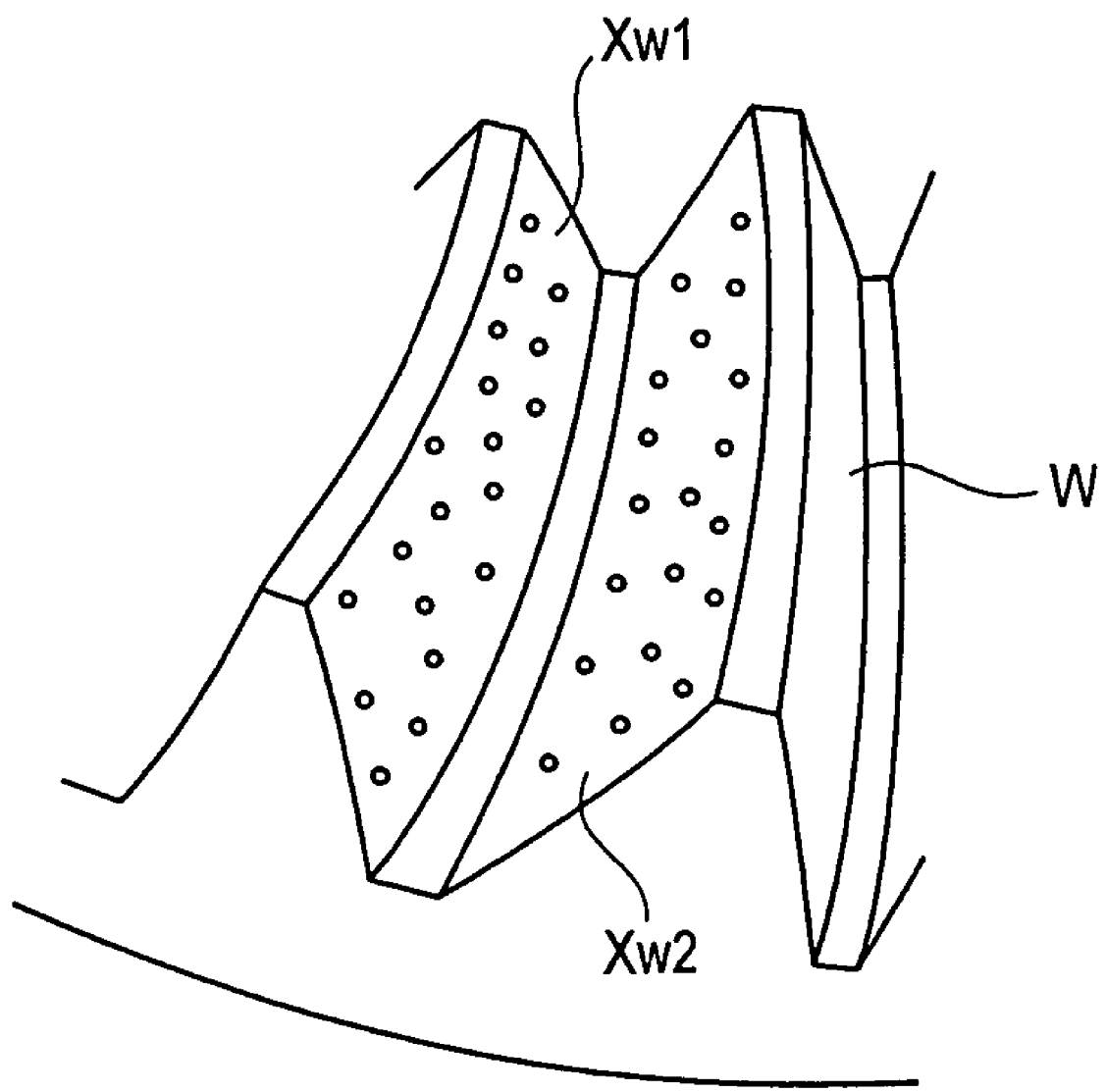
FIG. 6 is a perspective view of a tooth flank of a ring gear.

The tooth flank Xw of the workpiece W has a right flank Xw2 and a left flank Xw1 as shown in FIG. 6. Since these processing procedures of them are identical, the procedures in the case of measuring the left flank Xw1 are explained hereunder.

Figure 7:
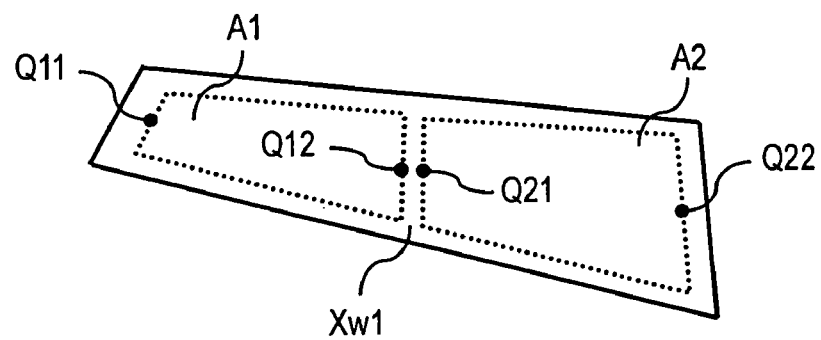
FIG. 7 is a view explaining a measuring area.

In the determination of a measuring area, one or more of measuring areas An are determined in a tooth flank area of the left flank Xw1. Various kinds of algorithms can be applied to this determination algorithm and in this case the measuring areas are determined by dividing the tooth flank equally in the tooth trace direction. FIG. 7 shows a tooth flank Xw1 and the measuring areas A1 and A2, divided into two equal pieces in the tooth trace direction, in which the left side of the drawing shows the inner side of the gear and the lower side thereof shows the root side of the tooth flank.

Thereafter, at step S50, the coordinate values and the normal vector at a representative point in each measuring area are computed.

As the algorithm of determining a representative point, there are various methods. For example, it is a common practice to determine one point in the center of a measuring area in the case of measuring a tooth pitch, and one point each at the both ends of a measuring area, two points in total, in the case of measuring the shape of a tooth flank. In the example of FIG. 7, the representative points Q11, Q12, Q21 and Q22 are determined at the both ends of the measuring areas A1 and A2 respectively at the center in the tooth depth direction of the tooth flank (the direction from the root to the tip of the tooth flank) and then coordinate values and the normal vector are computed for each representative point based on the theoretical expression.

Figure 8:
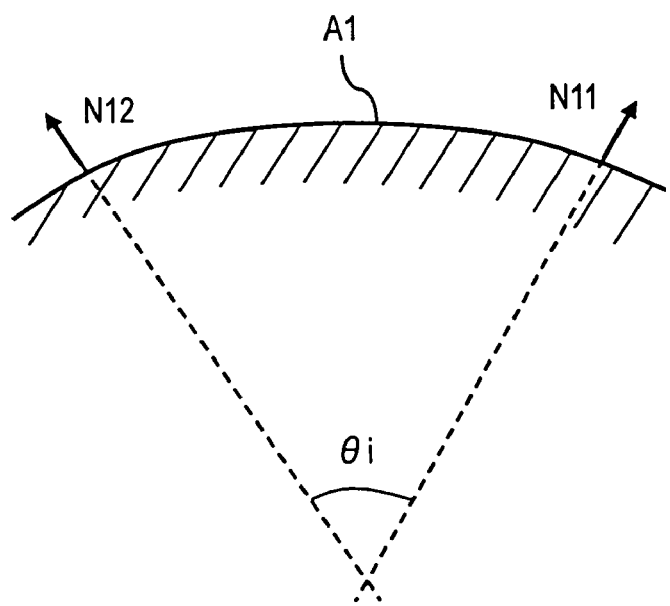
FIG. 8 is a view explaining an internal angle.

Next, at step S60, an internal angle θi formed at the intersection of the normal vectors N11 and N12 at the representative points Q11 and Q12 in the same measuring area (for example, A1) is computed (refer to FIG. 8) and whether the internal angle θi is within a predetermined angle range or not is judged. When the internal angle θi is within a predetermined angle range, the curvature of the tooth flank in the measuring area is judged to be small. That is, it is judged that the measurement can be executed in the measuring area with the stylus of the same axis angle θh without the necessity of changing the axis angle θh of the stylus, and therefore, in this case, the processing flow branches and goes to S80 and the axis angle of the stylus is determined.

On the other hand, when the internal angle θi exceeds a predetermined angle range, the curvature of the tooth flank in the measuring area is judged to be large. That is, if the measurement is executed in the measuring area with the same stylus axis angle θh without changing the stylus axis angle θh, it is judged that there arises the possibility of the interference between the workpiece W and the probe 110 and, in this case, the process flow branches and goes to S70 to divide the measuring area.

Figure 9:
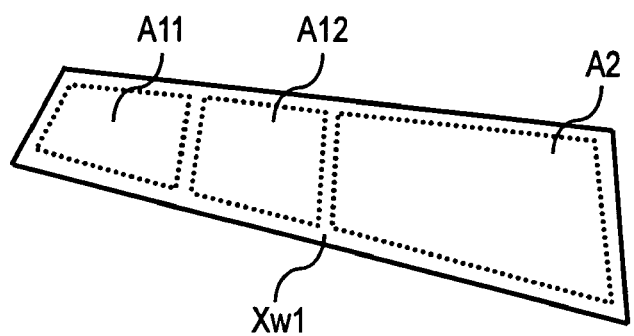
FIG. 9 is a view explaining the division of the measuring area.

As the algorithm for dividing a measuring area at step S70, various types are used and, in this case, the method of dividing a measuring area into two equal pieces in the tooth trace direction is used. FIG. 9 shows an example of the case where the measuring area A1 is divided into A11 and A12 by this method.

After the measuring area is divided at step S70, the process flow returns to S50 and the coordinate values and the normal vector of the representative point in each measuring area are computed again.

In this way, the division of a measuring area is repeated until the internal angle θi falls within a predetermined angle range.

Figure 10:
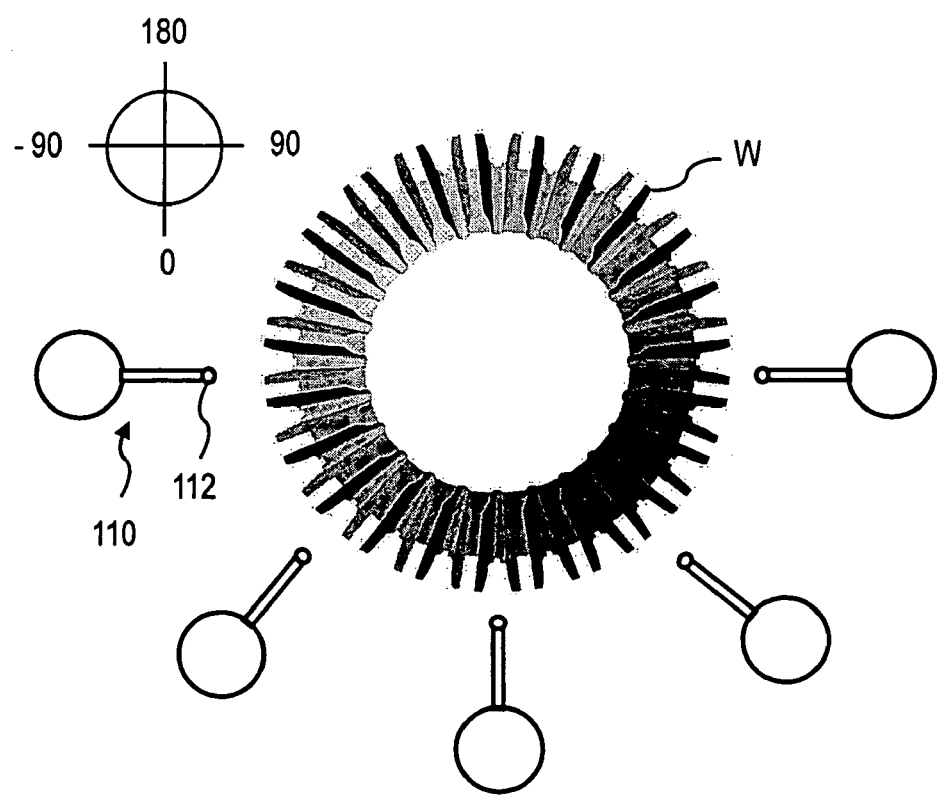
FIG. 10 is a view showing the relationship between a workpiece and a measuring probe with regard to an angle.

At S80, upon the determination of the axis angles θh and θv of the stylus 111, firstly a tangent vector Tw is computed. If the teeth of a gear are not curving but straight as shown in FIG. 10 for example, assuming that the plane of the drawing is the horizontal plane, the axis angle θh of the stylus 111 in the horizontal plane is univocally determined in accordance with the tooth flank to be measured. In contrast, in the case of a spiral bevel gear, the tooth flank curves as shown in FIG. 6 for example and therefore it is necessary to determine an axis angle θh in accordance with the angle of the curvature of a measuring area.

Figure 11:
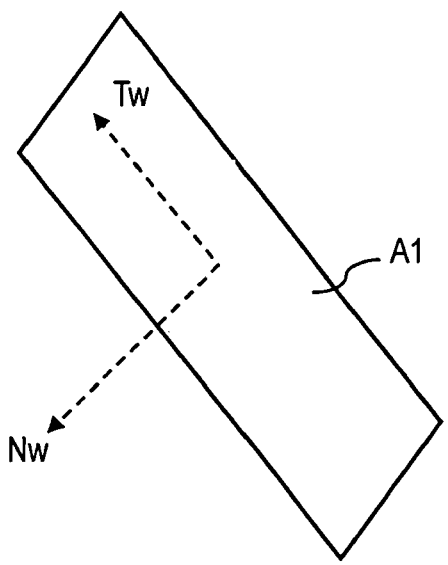
FIG. 11 is a view explaining a tangent vector.

For that purpose, as shown in FIG. 11, a tangent vector Tw in the tooth trace direction perpendicular to the normal vector Nw of the measuring area is determined, and the angle for parallelizing the plane that is tangent to a curved surface of a workpiece in the measuring area and also contains the tangent vector Tw (the plane perpendicular to the normal vector) and a plane that contains the axis 115 of the stylus 111 with each other is defined as the flank direction axis angle θh.

Figure 12:
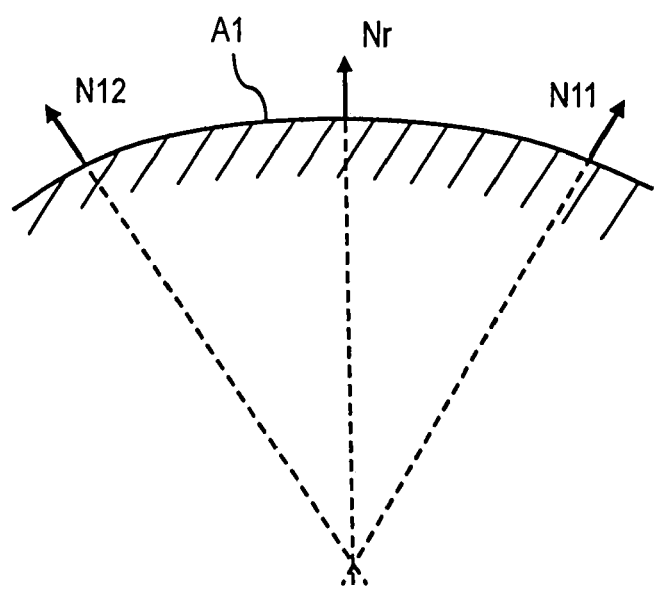
FIG. 12 is a view showing a representative normal vector.
Figure 13:
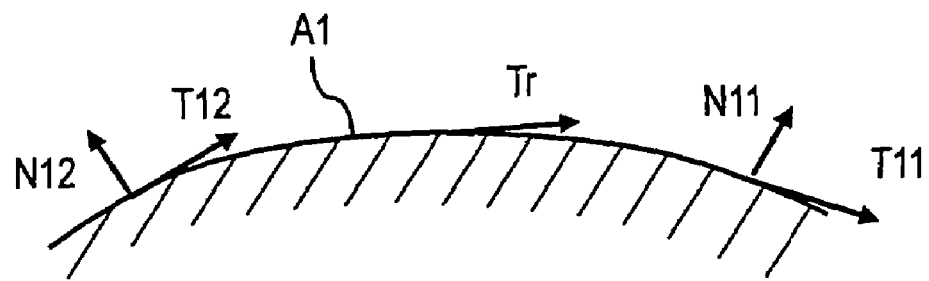
FIG. 13 is a view showing a representative tangent vector.

There are various methods for computing a tangent vector based on a normal vector and, in the case where plural representative points are determined in a measuring area, a tangent vector may be determined by either method, the method of compounding the normal vectors of the representative points, computing a representative normal vector Nr of the measuring area, and determining a representative tangent vector Tr from this representative normal vector Nr (refer to FIG. 12), or the method of determining each tangent vector from each normal vector, compounding those tangent vectors, and then determining the representative tangent vector Tr (refer to FIG. 13), and the like.

Figure 14:
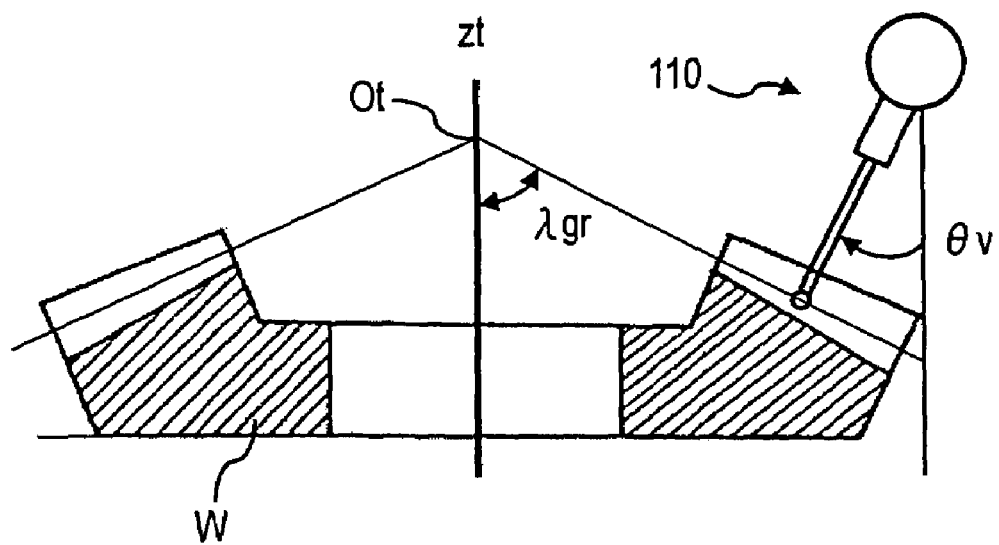
FIG. 14 is a view explaining a slant axis angle.

Next, as shown in FIG. 14, in the case where the measuring surface (in the tooth trace direction) of a workpiece W inclines to the reference surface, a slant axis angle θv (the axis angle in the tooth depth direction in the case of a bevel gear) is determined and this can be determined easily from the machine root angle kgr. In other words, the slant axis angle θv is determined based on the shape of the workpiece.

Here, the axis angles (the flank direction axis angle θh and the slant axis angle θv) are determined for each measuring area.

In the case of executing a manual measurement after the axis angle is determined for each measuring area in this way, by designating the measuring area, the axis driving circuit 225 controls the axis driving mechanism 117 and the angles of the axis 115 of the stylus 111 are adjusted to θh and θv. When the axis driving circuit 225 and axis driving mechanism 117 are not equipped with, the angles of the axis 115 of the stylus 111 are adjusted manually so as to be the angles θh and θv as indicated in a display.

Thereafter, at step S90, measurement conditions are input. The measurement conditions include the kind of a probe 110 to be used (a touch signal probe/a scanning probe), the maximum value/control resolution of stylus axis angles θv and θh, whether or not a workpiece W is rotatably mounted on a rotary table, the diameter of a probe spherical contact tip 112, a retract distance (a distance from a workpiece W that allows the axis angles of a stylus 111 to change safely), kind of measurement (pitch measurement/tooth flank shape measurement/multiple tooth flank shape measurement), the number of tooth flanks to be measured, the direction of tooth flanks to be measured (right/left), and the like.

Next, at step S100, a measurement part program is generated.

Since the measuring area and the axis angles θh and θv of the stylus 111, which are to be tuned when the measuring area is measured, are already determined, it is possible to generate a measurement part program for each measuring area based on the measurement conditions and the theoretical expressions (Xg and Ng).

The measurement part program includes a stylus axis angle tuning command that tunes the axis angles of the stylus 111 by controlling the axis driving mechanism 117 via the axis driving circuit 225.

Further, with regard to a probe used for measurement, since the measurement method by a touch signal probe is different from the method by a scanning probe, a measurement part program conforming to the measuring probe (a touch signal measurement part program, a scanning measurement part program, etc.) is generated.

The generated measurement part program is run by a measurement part program execution program (not shown in the figures) incorporated in the computer 300, the coordinate measuring machine 100 is controlled via the controller 200, and intended measured data are output from the controller 200.

Next, at step S110, the determination of a workpiece coordinate system is executed, which is required when an actual workpiece W is mounted on the coordinate measuring machine 100.

Figure 5:
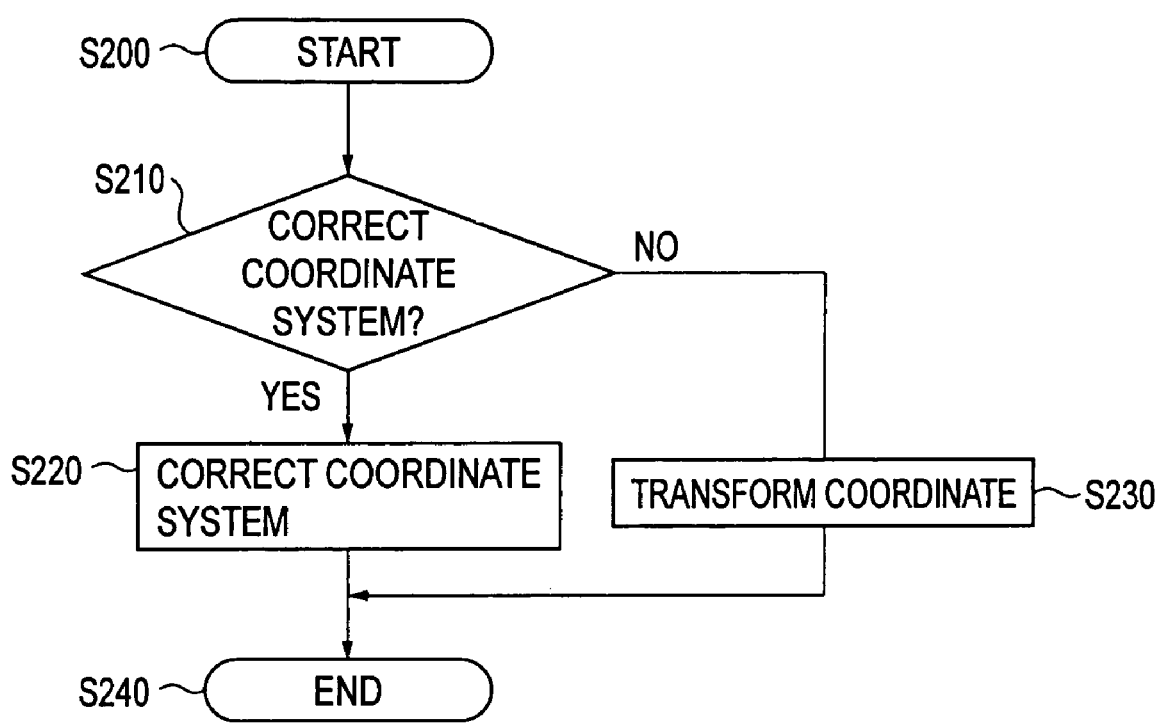
FIG. 5 is a flowchart showing the detail of determining a coordinate system according to the first embodiment of the present invention.

Detailed contents of the processing at step S110 are shown in the flowchart of FIG. 5.

Whereas the measurement part program generated at step S100 is generated by the theoretical coordinate system, in the event of the measurement of an actual workpiece W, a workpiece coordinate system is determined. Since the workpiece coordinate system usually does not coincide with the theoretical coordinate system, it is necessary to conform the former coordinate system to the latter one or to transform the coordinate values of the measurement part program into the coordinate values of the workpiece.

In the case where it is desirable to conform a workpiece coordinate system to a theoretical coordinate system, the conformation is executed at step S220.

On the other hand, in the case where it is desirable not to conform a workpiece coordinate system to a theoretical coordinate system (for example, the case where it becomes difficult to intuitively understand the theoretical coordinate system depending on the shape and mount attitude of a workpiece W at the time when the workpiece W is mounted on a coordinate measuring machine), the coordinate transformation is executed at step S230.

Those ramifications are carried out at step S210. Usually, an operator judges which case should be adopted.

At step S220, a workpiece coordinate system is once determined by temporarily adopting the coordinate system O of a coordinate measuring machine, thereafter one or more points of the workpiece W are subjected to measurement and, based on the result, the temporary workpiece coordinate system is corrected.

The attitude of the workpiece W mounted on a measurement table 101 is not particularly regulated and, for simplicity, the explanations here are done on the premise that the workpiece W is a ring gear of a hypoid gear and it is mounted so that a reference plane Wb thereof abuts on the measurement table 101. Then, the configuration is determined so that the axis zg of the ring gear is parallel to the z axis of the coordinate measuring machine, the gear center Og is the origin point of the z axis of the coordinate measuring machine, and the axis zg of the ring gear takes the position of the origin point O of the x and y axes of the coordinate measuring machine.

Figure 15:
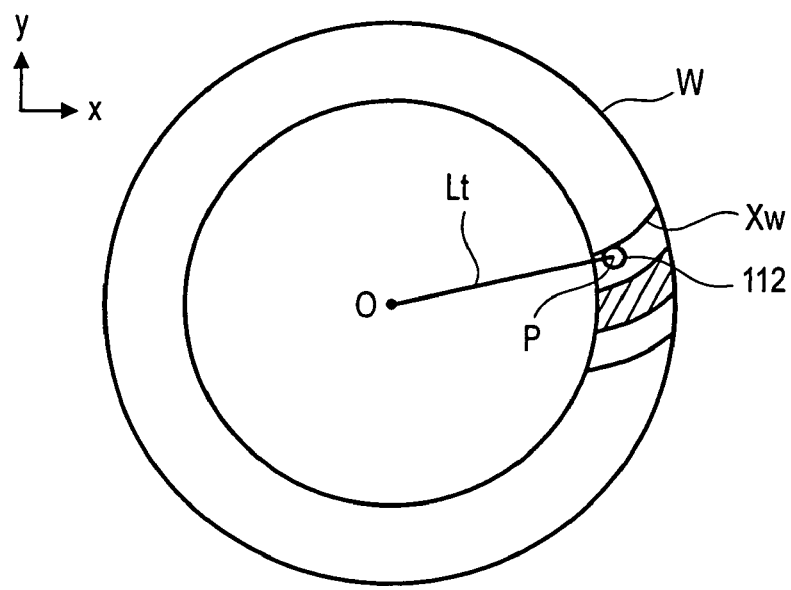
FIG. 15 is a view explaining the determination of a coordinate system.

Thereafter, the spherical contact tip 112 of the probe 110 is brought into contact with one point of the tooth flank Xw of the workpiece W and the center position p (px, py and pz) of the spherical contact tip 112 is read out (refer to FIG. 15). From the result, the length Lt ($=(px2+py2)^{1/2}$) of a straight line O-p, the distance from the origin point O to the center position p (px, py and pz), on the xy plane is computed.

Next, in the coordinate system Og of the gear (coordinate system of the theoretical expression), the position is identified at the height of pz so that the distance from the gear center on the xg-yg plane to the center position pg of the spherical contact tip 112 equals to Lt on the assumption that the spherical contact tip 112 is brought into contact with the theoretical tooth flank shown by the tooth flank expression (4) and the angle θg formed by the xg axis and the center position pg is computed.

Figure 16:
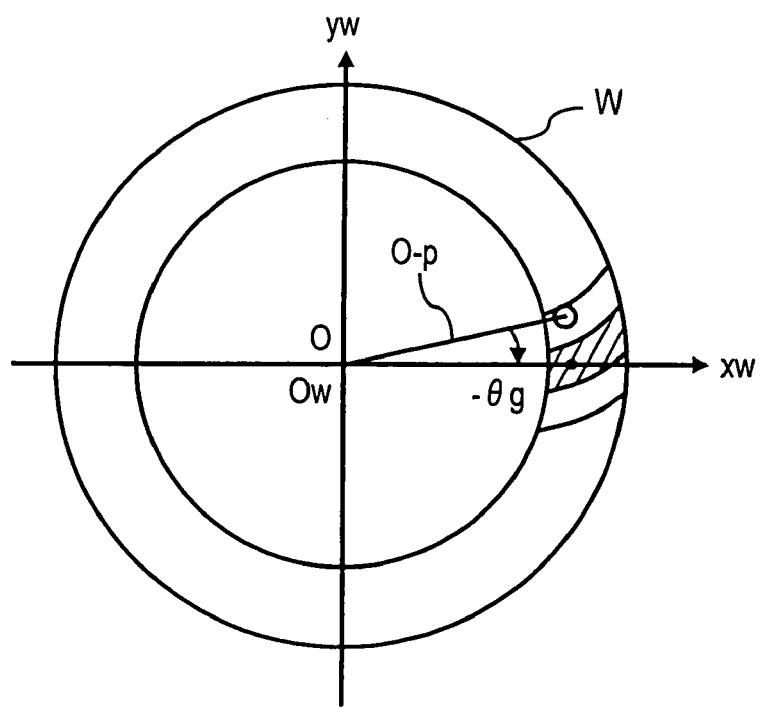
FIG. 16 is another view explaining the determination of a coordinate system.

Next, as shown in FIG. 16, at the time when the straight line O-p is rotated by the angle of −θg around the z axis, the direction of the straight line is defined as an xw axis (X axis of the workpiece coordinate system), a yw axis (Y axis of the workpiece coordinate system) that passes through the origin point O and is perpendicular to the xw axis is determined, and the Z axis is defined as a zw axis (Z axis of the workpiece coordinate system) as it is. Through these processes, the workpiece coordinate system Ow conformed to the gear coordinate system Og in the theoretical expression is determined.

Here, if the same processing is applied to plural points (the height in the Z axis direction is not necessarily identical) of a tooth flank, the plural workpiece coordinate systems are identified, and the workpiece coordinate system Ow is determined by averaging the plural workpiece coordinate systems, a workpiece coordinate system with a higher degree of accuracy can be established.

In the case where the measurement coordinate system is rotated and the workpiece coordinate system conformed to the gear coordinate system is determined as stated above, since the theoretical expressions (4) and (5) are conformed to the tooth flank expression in the workpiece coordinate system, those are defined as the workpiece tooth flank expression Xw and the unit tooth flank normal line Nw.

On the other hand, in the case where the coordinate system of the theoretical expression is not conformed to the workpiece coordinate system, the coordinate transformation is carried out at step S230. In this case, the workpiece coordinate system is not rotated, the workpiece coordinate system is determined while the direction of the straight line O-p is regarded as the direction of the xw axis as it is, and the coordinate values and the axis angles of the measurement part program are rotated by an angle of $-\theta g$ around the zg axis.

Otherwise, it is also acceptable to compute the workpiece tooth flank expression Xw and the unit tooth flank normal line Nw by rotating the theoretical expressions (4) and (5) by an angle of $-\theta g$ around the zg axis and to reproduce the measurement part program based on the new workpiece coordinate expressions.

The processing ends at step S120 but, after that, it is still possible to measure the workpiece W by using the measurement part program as occasion demands.

Embodiment 2

Embodiment 2 is the case where the computer 300 of Embodiment 1 is replaced with a computer 400 and other configurations thereof are the same as Embodiment 1.

Figure 17:
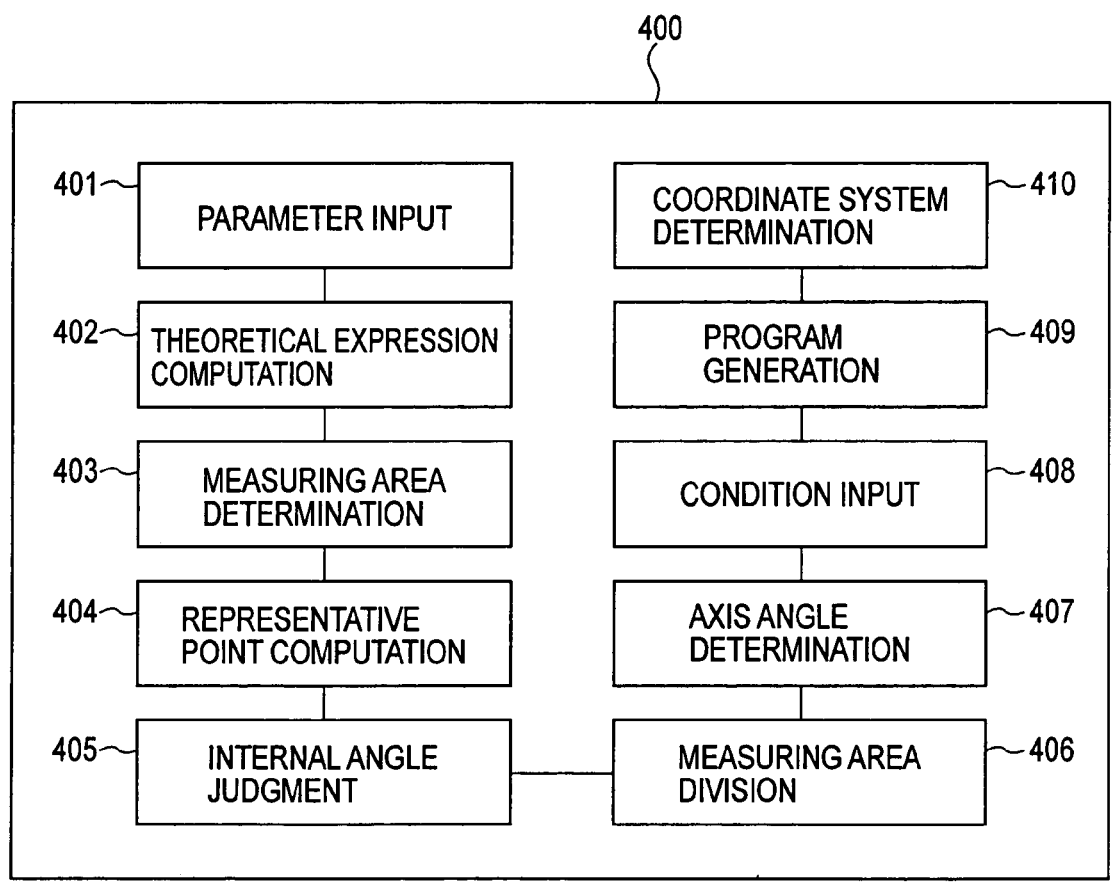
FIG. 17 is a block diagram showing a computer according to a second embodiment of the present invention.

FIG. 17 shows the block diagram of the computer 400.

In FIG. 17, the contents of the operations of a parameter input circuit 401 are identical to those of S20 in FIG. 4, those of a theoretical expression computation circuit 402 identical to those of S30 in FIG. 4, those of a measuring area determination circuit 403 identical to those of S40 in FIG. 4, those of a representative point computation circuit 404 identical to those of S50 in FIG. 4, those of an internal angle judgment circuit 405 identical to those of S60 in FIG. 4, those of a measuring area division circuit 406 identical to those of S70 in FIG. 4, those of an axis angle determination circuit 407 identical to those of S80 in FIG. 4, those of a condition input circuit 408 identical to those of S90 in FIG. 4, those of a program generation circuit 409 identical to those of S100 in FIG. 4, and those of a coordinate system determination circuit 410 identical to those of S110 in FIG. 4. Therefore, detailed explanations are avoided here.

Note that, when the theoretical expression is already known or when the shape expression is already derived from the analysis result of measured data, it is also acceptable, instead of the computation of the theoretical expression based on the parameters such as designed values and the like, to replace the parameter input circuit 401 and the theoretical expression computation circuit 402 with a theoretical expression input circuit, directly input the theoretical expression or the shape expression, and use it as the theoretical expression in each of the succeeding circuits.

Further, it is still acceptable that the coordinate system determination circuit 410 is composed of a coordinate system correction judgment circuit (the same operation as S210), a coordinate system correction circuit (the same operation as S220), and a coordinate transformation circuit (the same operation as S230).

Furthermore, each circuit contains a memory circuit of a predetermined capacity in which various kinds of input data and computation results are stored according to need.

Here, the computer 400 is further equipped with various I/O devices (a keyboard, a mouse, a display, a printer, a circuit I/O device, an auxiliary memory, etc.), not shown in the figures, and makes it possible to do various operations, the display and print of computed results and the like according to any purpose.

The measurement part program generated in the program generation circuit 409 is executed by a measurement part program execution circuit, not shown in the figures, of the computer 400, the coordinate measuring machine 100 is controlled via the controller 200, and intended measured data are output from the controller 200.

Note that, in any of the embodiments, the horizontally rotatable mechanism of a probe is controlled by the flank direction axis angle and the vertically tiltable driving mechanism of the probe is controlled by the slant axis angle.

Modification of Embodiment

The modification is the same as Embodiment 1 except that the processing at steps S20 to S50 of the measurement method of Embodiment 1 (FIG. 4) is modified.

Here, the steps of the modification corresponding to the steps of S20 to S50 in Embodiment 1 are defined as S20' to S50'.

In this modification, at step S20', basic parameters (for example, FIG. 21) based on the design drawing (two-dimensional design drawing shown in FIG. 18) of a workpiece W (gear) and machine setting parameters (for example, FIG. 22) are input. In this case, as the machine setting parameters, the theoretical values or values estimated from the result obtained by measuring an actual gear may be used.

Next, at step S30', the theoretical expression of a gear tooth flank is computed based on the basic parameters and the machine setting parameters. The theoretical expression can be computed by mechanistically describing the gear cutting process based on the theoretical or estimated machine setting parameters and, for example, the tooth flank expression Xg and the unit tooth flank normal line Ng of a ring gear of a hypoid gear are given by the expressions (4) and (5).

Here, Xg, A (a coordinate transformation matrix related to rotation around an xm axis), Xgc (the position vector on a cutting blade edge), Dg (the position of the cutter center Oc in the coordinate system Om of the gear generator), and Ngc (a unit normal line on the cutting blade edge) are all vectors. Further, u shows the rotating angle of the cutter 1 and v shows the distance from the cutter center Oc to the cutting blade edge. $\lambda$gr shows the machine root angle (root cone angle) (refer to FIG. 25).

Next, a coordinate transformation parameter between the design coordinate system Od (xd and zd) of the two-dimensional design drawing and the theoretical coordinate system (xg, yg and zg) of the three-dimensional theoretical expression is computed.

Figure 25:
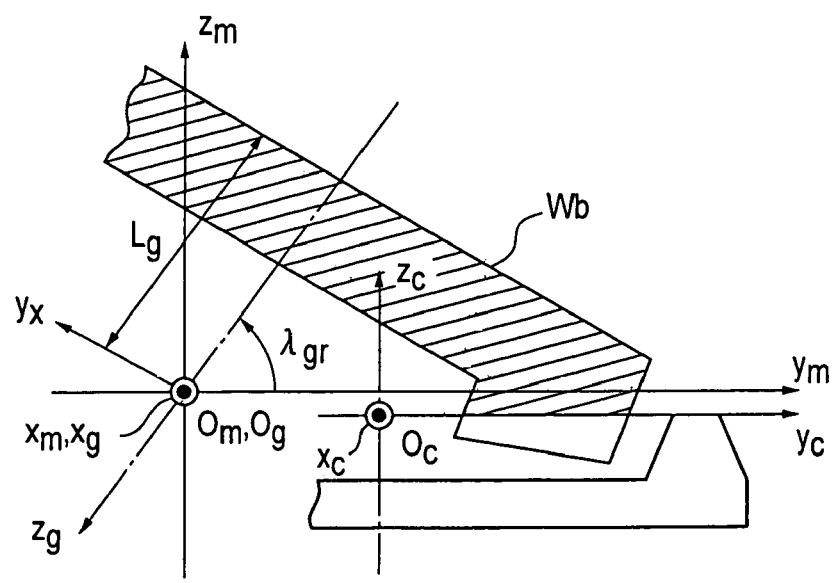
FIG. 25 is another view explaining a coordinate system in the gear cutting of the ring gear of the hypoid gear.

The origin point Og in the theoretical coordinate system of the gear shown in FIG. 25 is separate from the workpiece reference plane Wb by the distance Lg. In contrast, in the case of the design coordinate system shown in FIG. 18, since the origin point Od is located at the position of the workpiece reference plane Wb, the position of the zg axis of the theoretical coordinate system Og and that of the zd axis of the design coordinate system Od are conformed to each other but there exists an offset of the distance Lg.

Further, the xg axis of the theoretical coordinate system Og and the xd axis of the design coordinate system Od are parallel with each other and therefore the coordinate transformation from the design coordinate system Od (xd and zd) of the two-dimensional design drawing to the theoretical coordinate system (xg, yg and zg) of the three-dimensional theoretical expression may be executed by adding the value of offset-Lg (coordinate transformation parameter) to the zd axis coordinate of the design coordinate system Od. By this coordinate transformation manipulation, the points designated in the design coordinate system Od (xd and zd) of the two-dimensional design drawing correspond to the points on the xg-zg plane in the theoretical coordinate system (xg, yg and zg) of the three-dimensional theoretical expression.

Thereafter, at step S40', the measuring area is determined. The measuring area is determined as a region including a representative point (for example, Q1) in the design coordinate system shown in FIG. 18.

Next, at step S50', the three-dimensional coordinate values and the normal vector at the representative point in each measuring area are computed.

The representative point can be determined by using the same algorithm as Embodiment 1.

Figure 18:
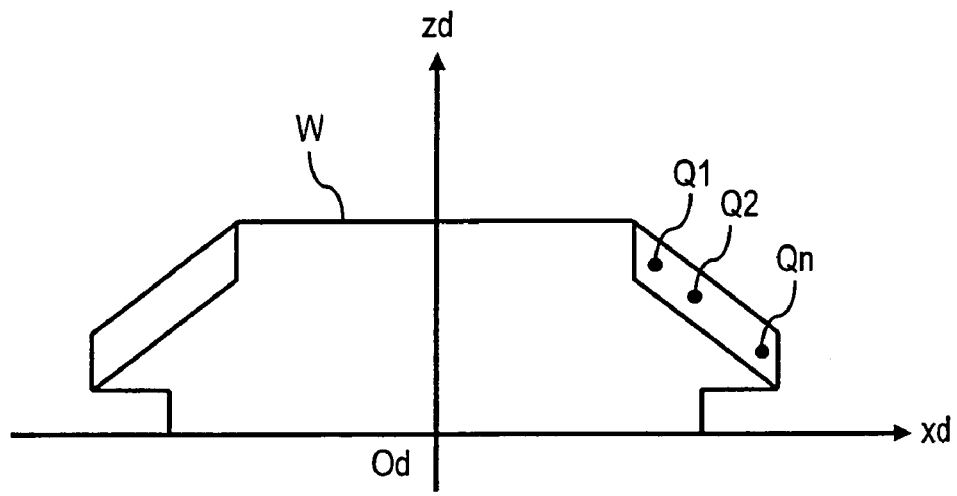
FIG. 18 is a view explaining a two-dimensional design drawing.

The assignment of the representative point is executed by assigning the measurement points (Q1, Q2, ..., Qn) on the two-dimensional design drawing of FIG. 18 and inputting the coordinate values (xd and zd).

After that, the three-dimensional coordinate values and the normal vector at each of the assigned points (Q1, Q2, ..., Qn) are computed.

Figure 19:
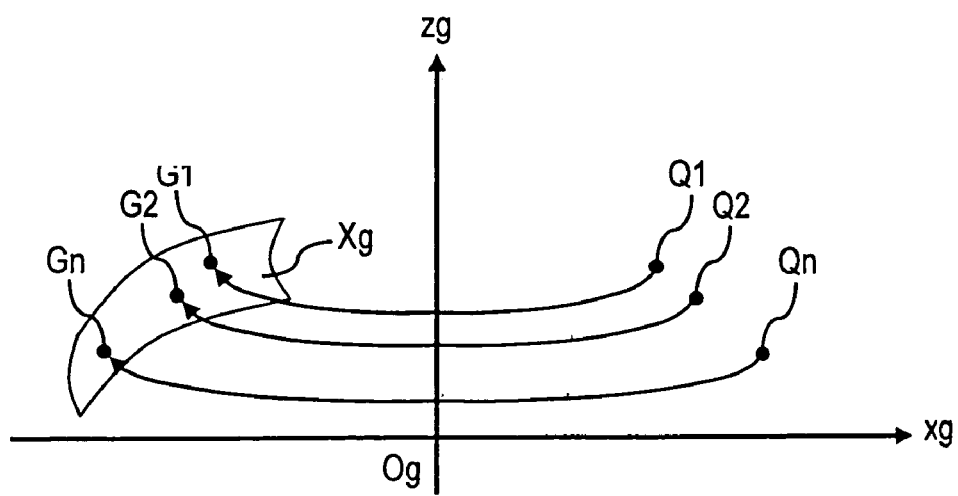
FIG. 19 is a view explaining the search of a designated point in a theoretical coordinate system.
Figure 20:
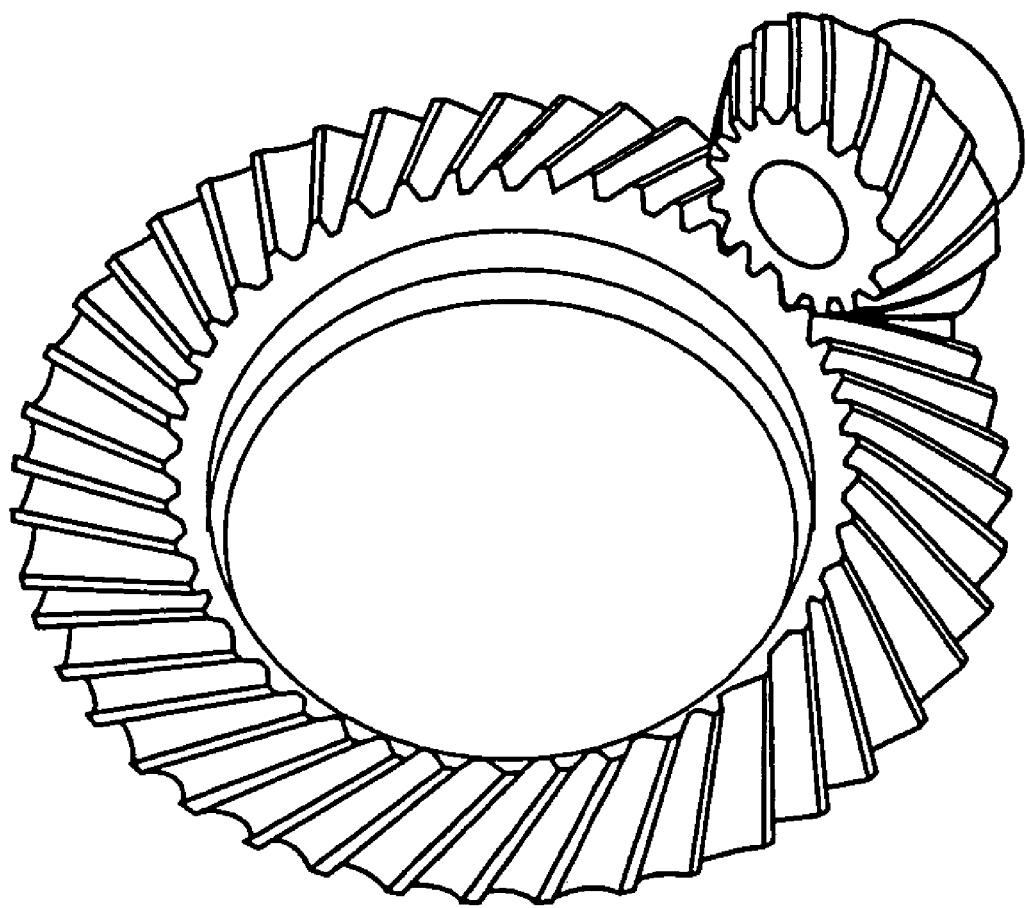
FIG. 20 is a view explaining a spiral bevel gear.
Figure 23:
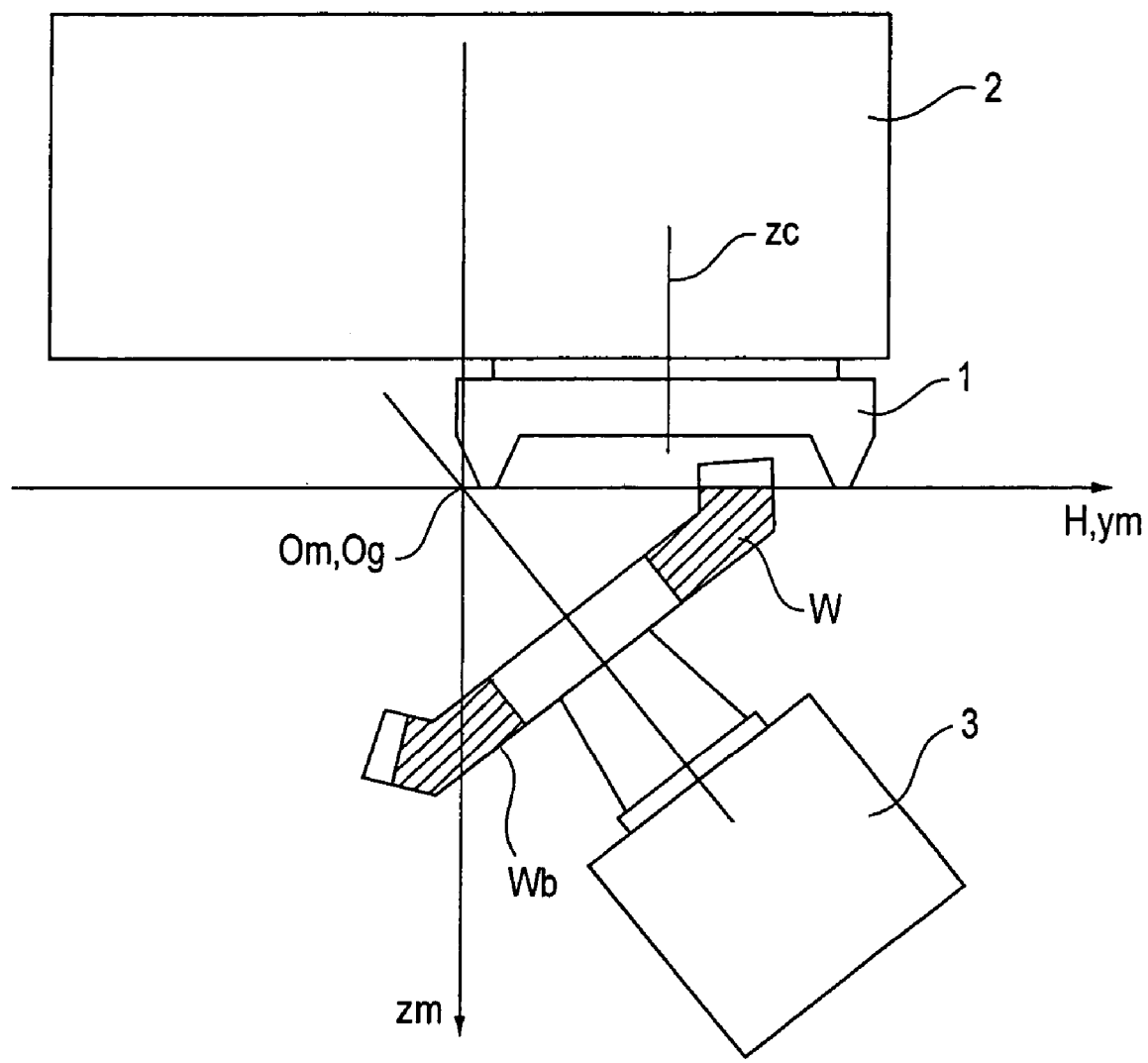
FIG. 23 is a view explaining an example of gear cutting principle of the ring gear of the hypoid gear.
Figure 24:
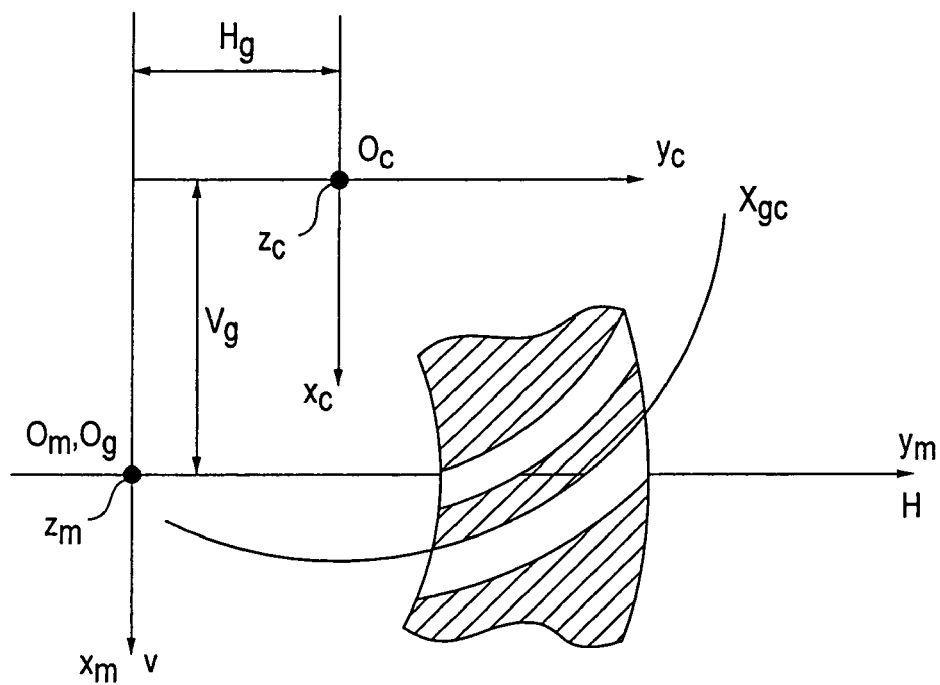
FIG. 24 is a view explaining a coordinate system in gear cutting of the ring gear of the hypoid gear.

As it has been explained earlier, each of the assigned points (Q1, Q2, ..., Qn) is transformed into the xg-zg plane in the theoretical coordinate system Og by using the coordinate transformation parameter (refer to FIG. 19).

Next, the distance Li from an assigned point Qi to the origin point Og is determined and the position of the point Gi is searched so that the distance from the origin point Og to the point Gi shown by the theoretical tooth flank expression Xg may be equal to the distance Li.

Once the point Gi on the theoretical tooth flank is determined, the three-dimensional coordinate values and the normal vector at the point Gi in the theoretical coordinate system are determined by the tooth flank expression Xg (expression (4)) and the unit tooth flank normal line Ng (expression (5)).

Here, the program generation in this modification is basically identical to the measurement part program generation (S100) in Embodiment 1. However, in the case of the modification, since the three-dimensional coordinate values and the normal vector at the assigned point (Qn) can be obtained based on the two-dimensional design drawing, the measurement points can be assigned based on the two-dimensional design drawing and, since the measurement conditions (the diameter of the spherical contact tip 112 of a measuring probe and the like) are already input, the measurement part program can be generated easily in the theoretical coordinate system Og based on those measurement conditions.

Here, with regard to a probe used for measurement, since the measurement method by a touch signal probe is different from the method by a scanning probe, a measurement part program conforming to the measuring probe (a touch signal measurement part program, a scanning measurement part program, etc.) is generated.

Further, it is acceptable, after the determination of the coordinate system (S110), to execute the generated measurement part program and obtain the measured data M, thereafter compute the error between the measured data and the theoretical three-dimensional coordinate values (equal to the coordinate values of the workpiece coordinate system Ow) at each measurement point, and display (numerical or image display) or output the error.

Further, though the case where the measurement part program is generated and run and then measured data are obtained is shown in this modification, as a further modification, manual measurement can be adopted and in this case the measurement part program generation step (S100) is not required.

When manual measurement is executed, after the determination of the coordinate system (S110), the measuring probe is slid manually, thus the spherical contact tip 112 is brought into contact with the workpiece surface to be measured, and, by the touch signal S generated at the time, the counter values D (xi, yi and zi) of each axis is input into the computer 300 as the measured data M.

Next, based on the x axis coordinate value xi and the z axis coordinate value zi of the counter values D, the computation of the assigned point is executed similarly to S50' of the modification, the point Gi in the theoretical coordinate system Og is searched, and the theoretical three-dimensional coordinate values at the point Gi are determined.

Thereafter, the error between the measured data M and the theoretical three-dimensional coordinate values (equal to the coordinate values of the workpiece coordinate system Ow) at the measurement point is computed and the error is output.

The present invention is not limited to those embodiments.

For example, in Embodiments 1 and 2, the cases where a coordinate measuring machine is used as the measuring machine are shown as the examples, but the present invention is not limited to the cases and is applicable to the cases where a surface texture measuring machine such as a surface roughness measuring machine, a contour measuring machine, a roundness measuring machine, a vision measuring machine or the like is used.

Further, not only a surface texture measuring machine that measures while a workpiece is fixedly mounted and a detector moves but also a surface texture measuring machine that measures while a detector is fixed and a substance to be measured moves is acceptable.

Furthermore, the processing procedures from S10 to S120 and from S200 to S240 can be incorporated into a program practicable by a computer and the program can be stored in a storage medium and supply to users. Here, the program may be written by any language practicable by a computer, such as a machine language, an assembler language, an advanced computer language or the like. Further, with regard to the form of execution by a computer, a form compiled by a compiler or an intermediate form executed by an interpreter is acceptable. Further, with regard to the form of providing a program for users, the program may be provided not only by storing it in a storage medium such as a flexible disc, an MO disc, a DVD disc, a magnetic tape or the like but also via a wired or wireless telecommunication line including Internet.

The priority application(s) Number(s) JP2003-358636 and JP2003-358637 upon which this patent application is based is hereby incorporated by reference.

What is claimed is:

1. A method for measuring a curved surface of a workpiece, comprising:
    a theoretical expression input step for obtaining a theoretical expression of the workpiece, the curved surface of which is measured with a measuring probe having a stylus;
    a measuring area determination step for determining a measuring area on the curved surface which is a range of measuring;
    a representative point computation step for defining a representative point in the measuring area and computing coordinate values and a normal vector of the representative point based on the theoretical expression;
    an axis angle determination step for determining an axis angle of the stylus within the measuring area based on the normal vector;
    an area measuring step for measuring the measuring area with the stylus while keeping the axis angle constant; and
    displaying the measured data of the curved surface;
    wherein the axis angle determination step computes a tangent vector in a flank direction in the measuring area of the curved surface of the workpiece based on the normal vector, and determines a flank direction axis angle of the stylus based on the tanaent vector;
    wherein the representative point computation step, in which the representative point includes a first end-point located at one end of the measuring area and a second end-point located at another end of the measuring area, computes first end-point coordinate values, a first end-point normal vector, second end-point coordinate values, and a second end-point normal vector based on the theoretical expression, and
    wherein the axis angle determination step determines the flank direction axis angle based on the tangent vector computed from the first end-point normal vector and the second end-point normal vector.

2. The method for measuring the curved surface of the workpiece according to claim 1,
    the theoretical expression input step comprising:
    a parameter input step for inputting basic parameters of the workpiece; and
    a theoretical expression computation step for computing the theoretical expression of the workpiece based on the basic parameters.

3. The method for measuring the curved surface of the workpiece according to claim 1, wherein the axis angle determination step computes a representative normal vector by compounding the first normal vector and the second normal vector, computes a representative tangent vector as the tangent vector based on the representative normal vector, and determines the flank direction axis angle based on the representative tangent vector.

4. The method for measuring the curved surface of the workpiece according to claim 1, wherein the axis angle determination step computes a first tangent vector and a second tangent vector based on the first normal vector and the second normal vector, and computes the tangent vector based on the first tangent vector and the second tangent vector to determine the flank direction axis angle.

5. The method for measuring the curved surface of the workpiece according to claim 1, wherein the measuring area determination step determines a predetermined number of measuring areas.

6. The method for measuring the curved surface of the workpiece according to claim 1, further comprising:
    a measuring area division step for determining an internal angle formed by the first normal vector and the second normal vector and, when the internal angle exceeds a predetermined angle range, dividing the measuring area,
    wherein the measuring area division step and the representative point computation step are repeatedly executed until the internal angle falls within the predetermined angle range, and
    wherein the axis angle determination step determines the flank direction axis angle for each of the divided measuring areas.

7. The method for measuring the curved surface of the workpiece according to claim 1, wherein the axis angle determination step determines a slant axis angle of the stylus based on a workpiece shape in the measuring area.

8. The method for measuring the curved surface of the workpiece according to claim 1, further comprising:
    a condition input step for inputting measurement conditions including information on a measuring machine; and
    a program generation step for generating a measurement part program to measure the workpiece based on the theoretical expression.

9. The method for measuring the curved surface of the workpiece according to claim 8, wherein the measurement part program contains a command of adjusting the angle of the stylus to the axis angle.

10. The method for measuring the curved surface of the workpiece according to claim 1, further comprising a coordinate system determination step for determining a workpiece coordinate system based on an attitude of the workpiece mounted on the measuring machine.

11. The method for measuring the curved surface of the workpiece according to claim 10, wherein the coordinate system determination step further comprises a coordinate system correction step for conforming the workpiece coordinate system to a theoretical coordinate system of the theoretical expression.

12. The method for measuring the curved surface of the workpiece according to claim 10, wherein the coordinate system determination step further comprises, when the workpiece coordinate system and the theoretical coordinate system of the theoretical expression are not conformed to each other, a coordinate transformation step for transforming coordinate values and the axis angle shown in the theoretical coordinate system into coordinate values and an axis angle shown in the workpiece coordinate system.

13. The method for measuring the curved surface of the workpiece according to claim 1, wherein the measuring probe is either a touch signal probe or a scanning measuring probe.

14. The method for measuring the curved surface of the workpiece according to claim 1, wherein the workpiece is a spiral bevel gear.

15. A method for measuring a curved surface of a workpiece, comprising:

a theoretical expression input step for obtaining a theoretical expression of the workpiece, the curved surface of which is measured with a measuring probe having a stylus;

a measuring area determination step for determining a measuring area on the curved surface which is a range of measuring;

a representative point computation step for defining a representative point in the measuring area and computing coordinate values and a normal vector of the representative point based on the theoretical expression;

an axis angle determination step for determining an axis angle of the stylus within the measuring area based on the normal vector;

an area measuring step for measuring the measuring area with the stylus while keeping the axis angle constant; and displaying the measured data of the curved surface;

the theoretical expression input step comprising:

a parameter input step for inputting basic parameters based on a two-dimensional design drawing of the workpiece; and a theoretical expression computation step for computing a three-dimensional theoretical expression of the workpiece based on the basic parameters;

wherein the representative point computation step determines the representative point by a two-dimensional coordinate based on the two-dimensional design drawing, and computes three-dimensional coordinate values and a normal vector of the representative point based on the three-dimensional theoretical expression.

16. The method for measuring the curved surface of the workpiece according to claim 15, further comprising a design coordinate transformation parameter computation step for computing a coordinate transformation parameter between a design coordinate system of the two-dimensional design drawing and a theoretical coordinate system of the three-dimensional theoretical expression.

17. A medium storing a program which makes a computer execute a method for measuring a curved surface of a workpiece to measure the workpiece, the method comprising:

a theoretical expression input step for obtaining a theoretical expression of the workpiece, the curved surface of which is measured with a measuring probe having a stylus;

a measuring area determination step for determining a measuring area on the curved surface which is a range of measuring;

a representative point computation step for defining a representative point in the measuring area and computing coordinate values and a normal vector of the representative point based on the theoretical expression;

an axis angle determination step for determining an axis angle of the stylus within the measuring area based on the normal vector; and an area measuring step for measuring the measuring area with the stylus while keeping the axis angle constant, wherein the axis angle determination step computes a tangent vector in a flank direction in the measuring area of the curved surface of the workpiece based on the normal vector, and determines a flank direction axis angle of the stylus based on the tangent vector;

wherein the representative point computation step in which the representative point includes a first end-point located at one end of the measuring area and a second end-point located at another end of the measuring area, computes first end-point coordinate values, a first end-point normal vector, second end-point coordinate values, and a second end-point normal vector based on the theoretical expression, and wherein the axis anale determination step determines the flank direction axis angle based on the tangent vector computed from the first end-point normal vector and the second end-point normal vector.

* * * * *

UNITED STATES PATENT AND TRADEMARK OFFICE
CERTIFICATE OF CORRECTION

PATENT NO. : 7,251,580 B2  
APPLICATION NO. : 10/965335  
DATED : July 31, 2007  
INVENTOR(S) : Nomura et al.

Page 1 of 1

It is certified that error appears in the above-identified patent and that said Letters Patent is hereby corrected as shown below:

Column 17, Line 33, (Claim 1, Line 26), delete "tanaent" and insert --tangent--.

Column 20, Line 27, (Claim 17, Line 27), after "step" insert --,-- (comma).

Column 20, Line 35, (Claim 17, Line 35), delete "anale" and insert --angle--.

Signed and Sealed this

Second Day of October, 2007

JON W. DUDAS  
*Director of the United States Patent and Trademark Office*